Sept. 10, 1929.   E. F. MAAS   1,728,162
BAND BUILDING MACHINE
Filed April 24, 1925   5 Sheets-Sheet 4
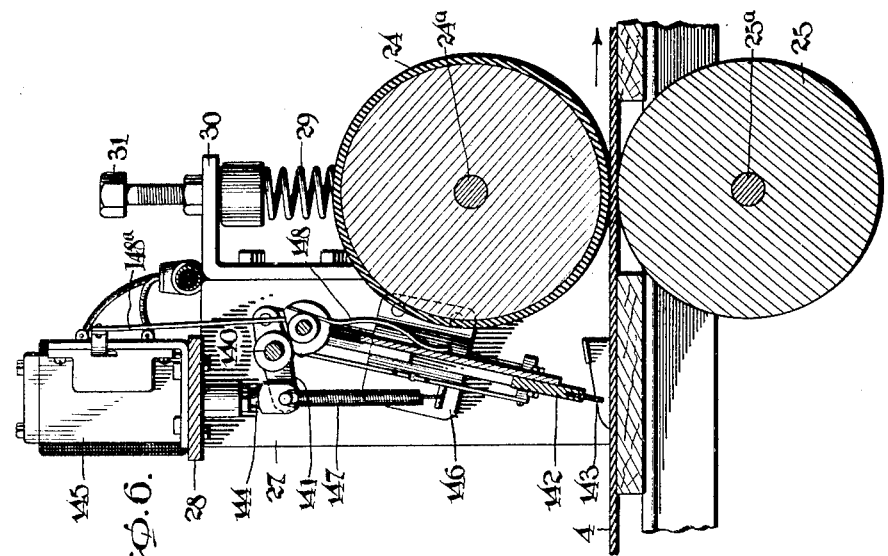
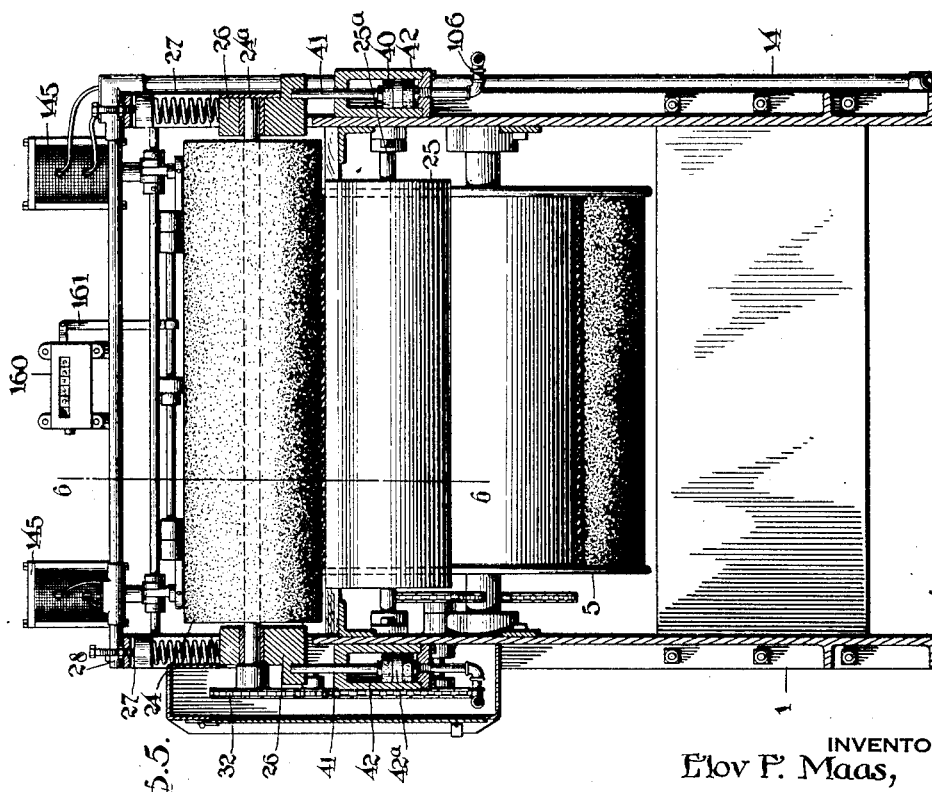
INVENTOR
Elov F. Maas,
BY
ATTORNEY

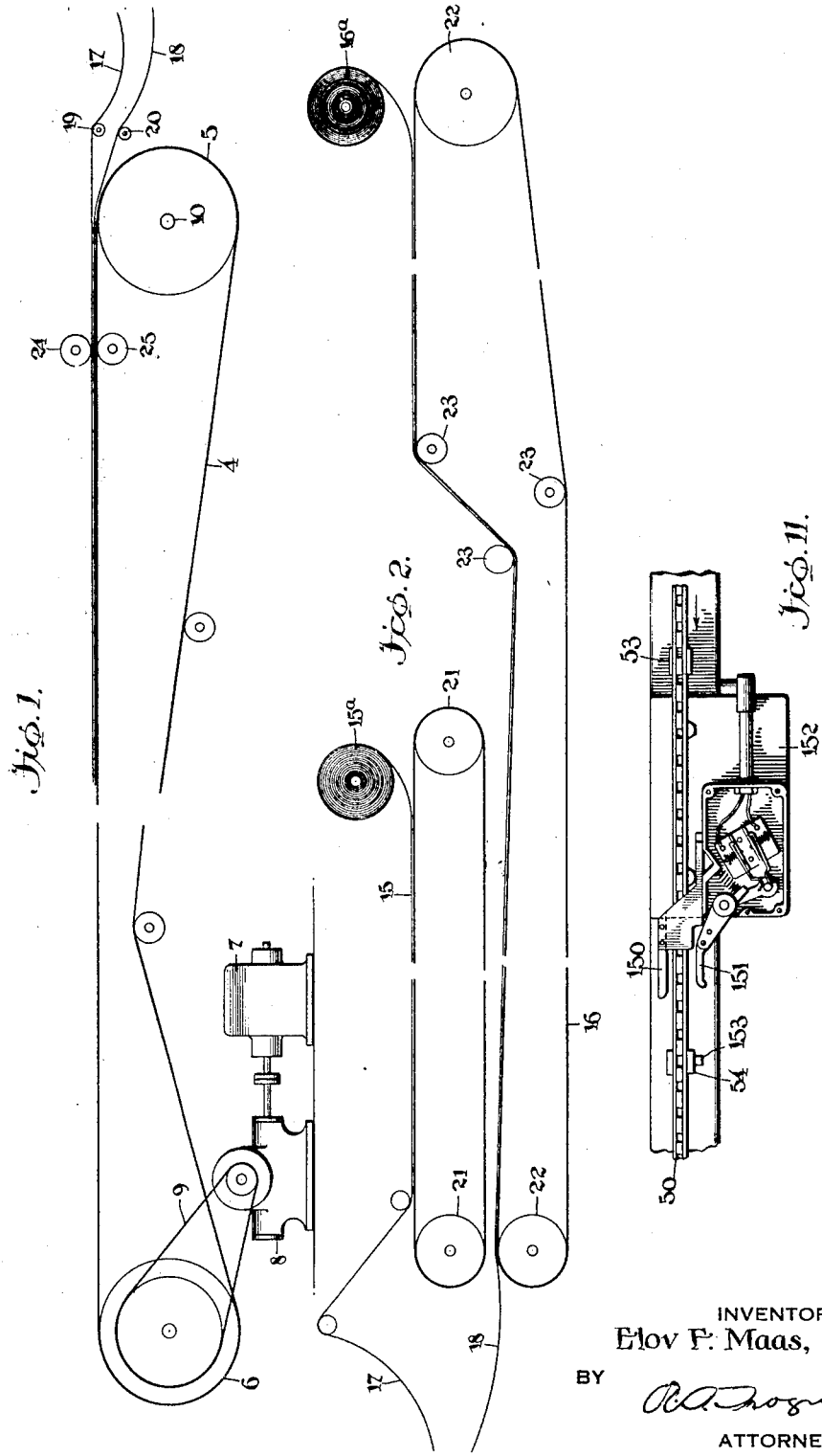

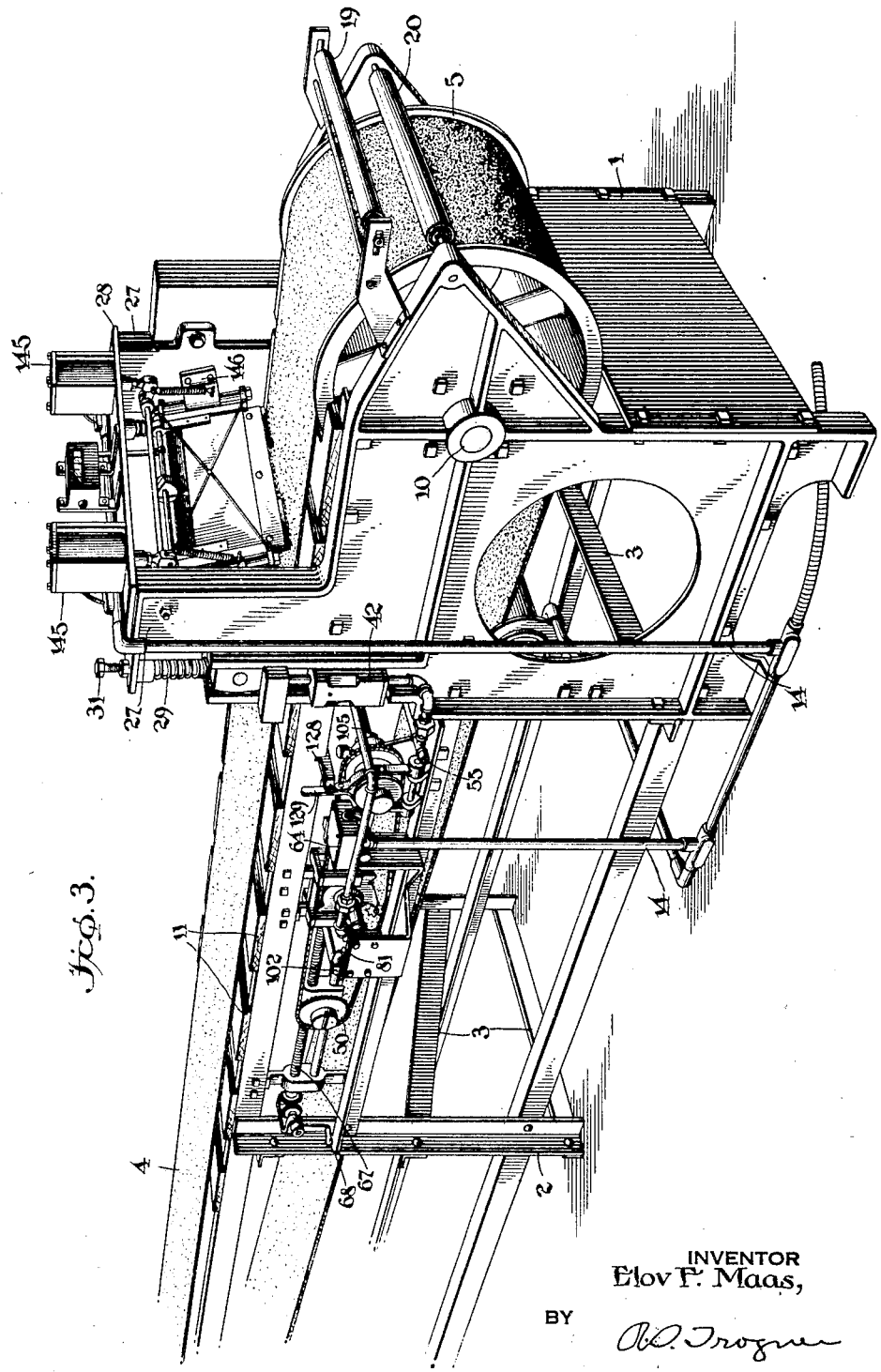

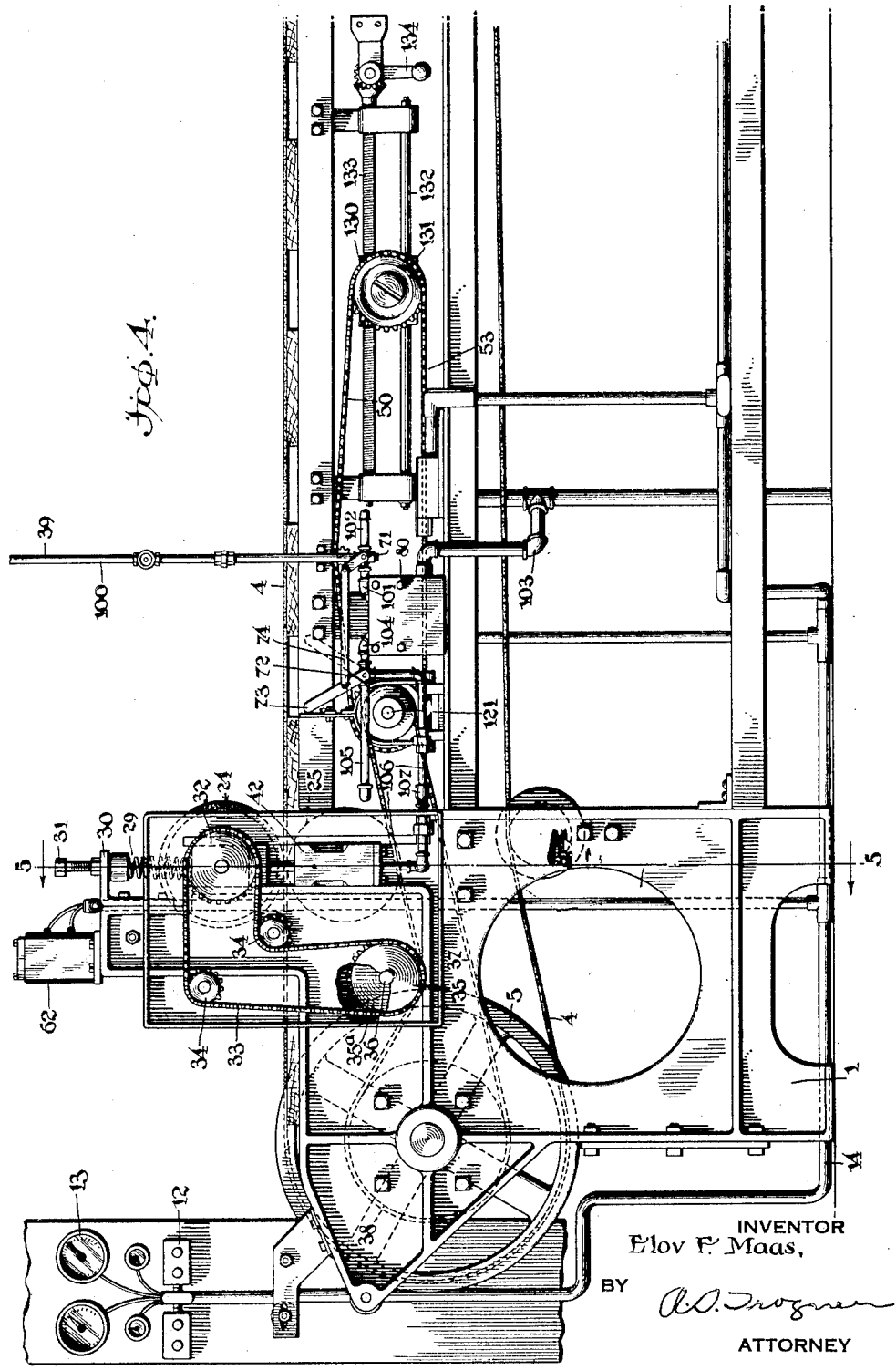

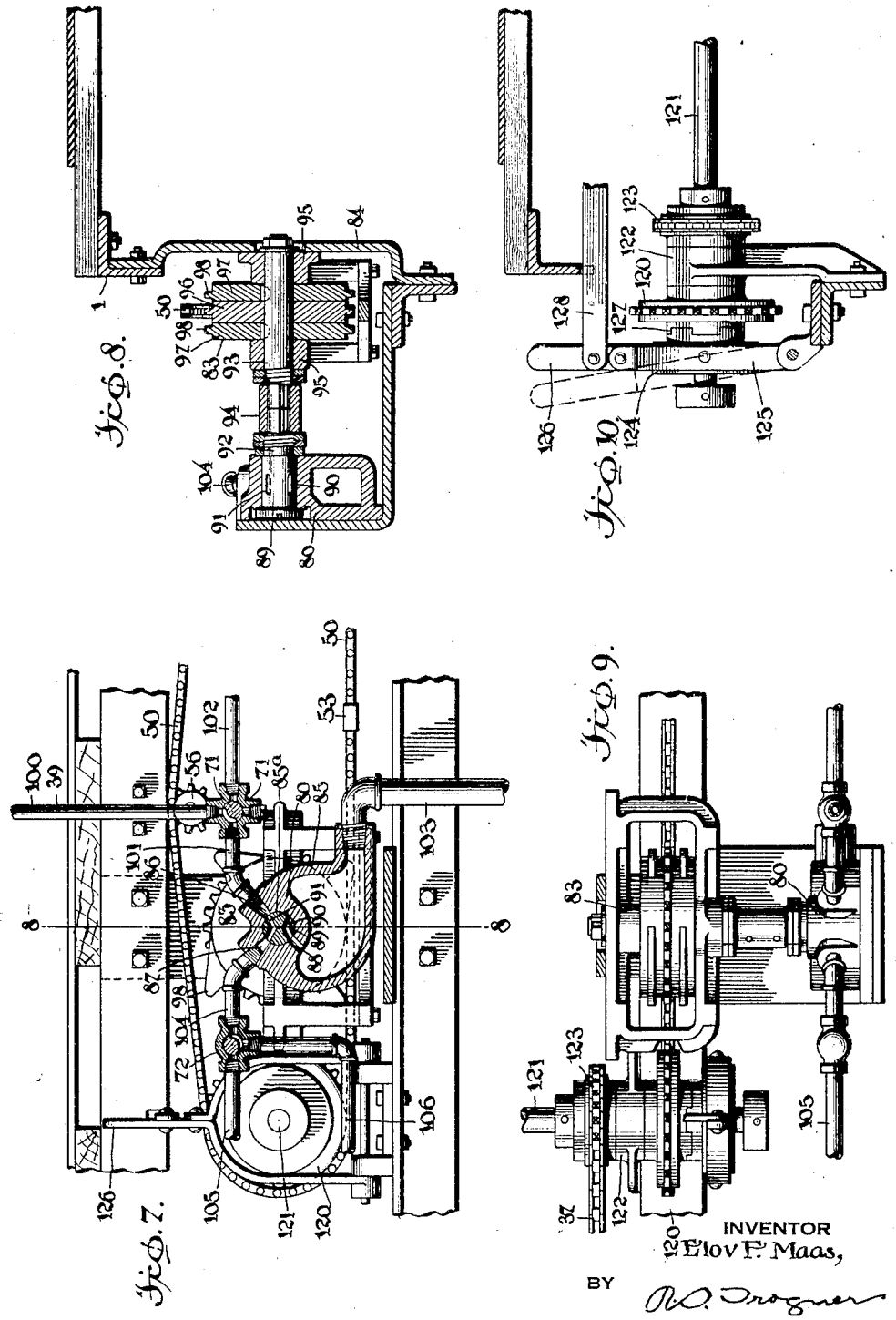

Patented Sept. 10, 1929.

1,728,162

UNITED STATES PATENT OFFICE.

ELOV F. MAAS, OF AKRON, OHIO, ASSIGNOR TO THE GOODYEAR TIRE & RUBBER COMPANY, OF AKRON, OHIO, A CORPORATION OF OHIO.

BAND-BUILDING MACHINE.

Application filed April 24, 1925. Serial No. 25,554.

My invention relates to machines for building pneumatic tire casings and it has particular relation to a machine adapted to facilitate the manufacture of products of the character designated by the so-called "band building" method.

One object of my invention consists in providing a machine adapted to facilitate the preparation of endless bands for use in building pneumatic cord tires by the band building method.

Another object of my invention is to provide a machine adapted to continuously stitch together a plurality of plies of tire fabric, and to plainly mark them at intervals representing the desired length of fabric to constitute an endless band for the purpose designated.

The fabric utilized in the manufacture of pneumatic cord tire casings is manufactured, and subsequently coated or impregnated with rubber while in the form of long strips. For convenience in handling, these strips are rolled into large rolls. In forming endless bands, of either one or more plies, it is necessary to sever these strips into lengths suitable for forming the endless bands utilized in the band building method. Heretofore, such bands have been measured and severed by hand, which is an inefficient, inaccurate, and tedious process. By my invention, I have eliminated those mistakes resulting from the inaccuracies and carelessness of the workman in measuring the length of suitable strips of fabric. Also, by the use of my machine the operator is enabled to produce a larger number of strips of absolutely uniform length, in a given time, and with less arduous labor, than has heretofore been possible.

For a more thorough understanding of the details of my invention reference may now be had to the accompanying drawings of which:

Fig. 1 is a diagrammatical side view of a portion of my machine illustrating the manner in which the tire fabric is introduced thereto;

Fig. 2 is a diagrammatical side view of the endless belts which convey the fabric to the machine proper;

Fig. 3 is a perspective view of one end of my novel machine;

Fig. 4 is a side elevational view, partially in cross-section and partially in elevation, of the opposite side of the machine illustrated in Fig. 3, portions of the machine being broken away for the sake of clearness;

Fig. 5 is a cross-sectional view of my machine, the section being taken along the line 5—5 of Fig. 4;

Fig. 6 is another cross-sectional view of my machine, the view being taken along the line 6—6 of Fig. 5;

Fig. 7 is an enlarged fragmentary view partially in cross-section, illustrating the valve mechanism employed in my invention;

Fig. 8 is a cross-sectional view of the valve and valve operating mechanism illustrated in Fig. 7, the section being taken along the line 8—8 thereof;

Fig. 9 is a plan view of the valve and valve operating mechanism illustrated in Figs. 7 and 8 and employed in my invention;

Fig. 10 is a detail view of a clutch mechanism employed in a machine constructed in accordance with my invention; and Fig. 11 is a detail view of an electric switch mechanism constituting a portion of my machine.

Referring more particularly to the drawings, my machine is provided with a supporting frame member 1 constructed of suitable building material, and comprising vertically and horizontally arranged reinforcing members 2 and 3, respectively. An endless belt 4, adapted to be driven at various uniform speeds, is supported at the two ends of the frame member 1 by means of two horizontally disposed rotatable roller members 5 and 6. The roller member 6 is driven from a convenient source of power, illustrated as an electric motor 7, through a suitable gear reduction mechanism 8, which, in turn, is operatively connected to the roll 6 by means of a sprocket chain or belt 9, as best illustrated in Fig. 1. The frame member 1 is provided with suitable bearings 10, within which the shafts of the roller members 5 and 6 are rotatably journaled.

The belt 4, actuated by the roller member 6, travels over the top surface of the frame 1 and slides upon horizontally disposed supporting members 11 secured to the frame 1, these members serving as a track for the belt. If desired, one set of the bearing members 10 may be made adjustable, to permit of relative lateral movement between the rollers 5 and 6 so that any slack in the belt may be compensated for, and the desired tension maintained therein. The energization and speed of the motor 7, and therefore of the belt 4, is controlled by means of electric switches 12 and rheostats 13, as best illustrated in Fig. 4, which are located adjacent the machine so that the operator may conveniently manipulate them. The conductors connecting the switches 12 and rheostats 13 to the motor 7 are housed within protective tubing 14. By means of this arrangement the operator is able to start or stop the belt, as well as regulate its speed, by properly operating the switches 12 and rheostats 13.

Adjacent the front end of the frame 1 are disposed two additional endless belts 15 and 16, as illustrated diagrammatically in Figure 2, which are driven at the same speed as the belt 4, and are employed for the purpose of feeding tire fabric material on the belt 4 in superimposed relationship. A rubberized fabric strip, from which the endless bands are to be manufactured, is fed on to each of the belts 15 and 16 from rolls of fabric 15$^a$ and 16$^a$, respectively, thus enabling the operator to secure the end of a new roll of fabric to the end of an exhausted roll as it moves on the conveying belt 15 or 16, as the case may be. This provides two continuous strips of fabric which may be fed from the belts 15 and 16 as indicated at 17 and 18 of Fig. 2, and guided over suitable rolls 19 and 20, respectively, so as to enter upon the belt 4 in superposed relationship.

The belt 15 is mounted upon and actuated by two spaced roller members 21. The belt 16 is likewise mounted upon and actuated by two spaced roller members 22, and passes over a plurality of intermediately disposed idler roller members 23. The rollers 22 and 23 are so positioned, with respect to the rollers 21 that a portion of the belt 16 is disposed in alinement with and in the same plane as the belt 15, and the remainder is disposed beneath the belt 15. By means of this arrangement, the fabric strips 17 and 18 are fed to the belt 4 in superimposed relationship, but the splicing of successive rolls of fabric and the inspection thereof may be effected without incurring any liability of injury from overhanging moving belts.

The fabric strip 17 engages the strip 18 as the strip 18 engages the belt 4, by means of which the two strips, or more if desired, disposed in superimposed relationship, are transported between two stitching or mangle rolls 24 and 25, disposed one on each side of the belt 4. As best shown in Figs. 5 and 6, the rolls 24 and 25 are mounted on rotatable shafts 24$^a$ and 25$^a$, respectively, which are journaled upon the frame 1, the shaft 25$^a$ being supported by stationary bearings and the shaft 24$^a$ being provided with slidably mounted bearing members 26 secured in a frame or supporting device comprising two upright members 27 connected together at the top by means of a transverse member 28. Mounted upon each of the frame members 27 is a bracket 30, which serves as a base for two compression springs 29 which engage the slidable bearing members 26 to normally maintain the roll 24 in resilient engagement with the belt 4 and the fabric strips 17 and 18 disposed thereon. Adjusting screws 31, mounted in threaded engagement upon the brackets 30 enables the operator to adjust the force exerted on the bearings 26 by the springs 29.

Rigidly mounted on one end of the shaft 24$^a$ is a sprocket wheel 32, as best shown in Fig. 4, which is adapted to be operated by means of a driving chain 33 passing over two idler sprocket wheels 34, and a driving sprocket wheel 35. The sprocket wheel 35 is rigidly mounted upon a shaft 36. A second sprocket wheel 35$^a$ of equal size with the wheel 35, is also rigidly mounted on the shaft 36 beside the wheel 35 and is driven by a chain 37, which is in turn driven by a sprocket wheel 38 mounted on the shaft of the roll 5, thus causing the roll 24 to rotate when the roll 5 is actuated and at a speed directly proportional thereto. By reason of the arrangement of the sprocket wheels 32 and 34 and the cooperating chain 33, the roll 24 may be raised vertically a short distance to a position out of contact with the belt 4 without interfering with the driving thereof by means of the chain 33. As the roll 24 is rotated at all times at the same peripheral speed as the belt 4, it does not, in any manner, mar the fabric strips when lowered into contact therewith.

To provide an efficient means for raising the roll 24 I have provided a fluid actuated mechanism comprising two cylinders 42, of which one is mounted on each side of the frame 1. The cylinders 42 are each provided with a piston 42$^a$ which is connected to the bearing 26 by means of a piston rod 41. When a suitable fluid, preferably air, under pressure, is admitted to the cylinders 42 through suitable piping connections 39, the pistons 42$^a$ are raised, causing the associated bearing members 26 to be raised against the action of the springs 29.

The energization of the cylinders 42 is controlled by means of two similar valves 80 and 81, disposed one on each side of the machine which control the fluid flow in the piping connections 39. The piping connections 39 comprise a pipe 100 connected at one end to any suitable source of fluid under pressure and at the other end to a two way valve 71, which in turn is connected to two oppositely disposed pipes 101 and 102 connected to valves 80 and 81, respectively. The pipe 101 is connected directly to the valve 80, which in turn is connected to an exhaust pipe 103 and to a second pipe 104. The pipe 104 is connected to a two way valve 72 which in turn is connected to two pipes 105 and 106. The pipe 106 is connected to the bottom of the cylinder 42 at one side of the machine and is in open communication with a pipe 107 which communicates with the cylinder 42 on the opposite side of the machine. The pipe 105 is connected to the valve 81, disposed on the opposite side of the machine, as best shown in Fig. 3, which is also connected to the intake pipe 102 and to the exhaust pipe 103. The valves 71 and 72 are interconnected by means of a rod 74 and are thereby operated in unison by means of a handle 73.

The valves 71 and 72 are both two way valves of any desired construction and are so arranged that when in the position shown in Fig. 4, the air, or other actuating fluid medium passes from the pipe 100 to the pipe 101, and thence to the valve 80. The valve 72, in the position shown, connects the pipe 104 to the pipe 106. In like manner, when the handle 73 is moved to its opposite position, indicated in dot-and-dash lines, the valve 71 connects the pipe 100 to the pipe 102 which in turn is connected to the valve 81 and the valve 72 connects the pipe 105, which communicates with the valve 81, to the pipe 106, which communicates with the cylinders 42.

The valves 80 and 81 are similar in all respects and are each provided with an operating mechanism 83. As best shown in Figs. 7 to 10, inclusive, the valve 80 and driving mechanism 83 are mounted upon, and supported by a bracket 84, which in turn is mounted upon the frame 1. The valve 80 consist of a stationary annular portion 85, provided with a circular opening 85ᵃ and with a vent 86 connected to the intake pipe 101, a vent 87 connected to the pipe 104, and a vent 88 connected to the exhaust pipe 103. A circular valve core 89 is disposed within the circular opening 85ᵃ and is provided with two fluid passageways 90 and 91 extending therethrough. In the position illustrated in Fig. 7, the vents 86 and 87 are connected together by means of the passageway 91, and the exhaust pipe 103 is disconnected therefrom. When the valve core 89 is rotated through an angle of 90°, the vent 90 connects the pipe 104 to the exhaust pipe 103 through the vents 87 and 88 and seals the vent 86. When the core 89 is rotated an additional 90°, the pipes 101 and 104 are again placed in communication with each other by means of the duct 90. Thus for each complete revolution of the member 89, the pipe 104 is twice connected to the supply pipe 101 and twice to the exhaust pipe 103.

The rotatable valve core 89 is mounted upon, and intermittently rotated by, a shaft 92 which is connected to a rotatable shaft 93, constituting a portion of the valve operating mechanism 83, by means of a coupling member 94. The shaft 93 is journaled in bearing members 95 which are supported by the bracket 84. Loosely mounted upon the shaft 93 is a sprocket wheel 96 which engages and is continuously rotated by a sprocket chain 50. Disposed on each side of the sprocket wheel 96, and keyed to the shaft 93, is an annular rotatable member 97, each provided with four equally spaced substantially radially projecting lugs 98, the lugs on the two members being disposed opposite each other in pairs. Mounted on each of the sprocket chains 50, are two lugs 53 and 54, each of which is adapted to engage a lug 98 on each of the members 97 and to rotate the members 97 through an angle of 90°. The members 97, being splined to the shaft 93, rotate it and thus rotate the valve core 89 of the valve 80.

In order to drive the sprocket chain 50, which operates the valve actuating mechanism 83, it is provided at one end with a driving wheel 120 loosely mounted upon a shaft 121 journaled in a bearing member 122, as best illustrated in Figs. 9 and 10. Also splined upon the shaft 121 is a sprocket wheel 123 which is driven by the sprocket chain 37 from the driving wheel 38 mounted upon the roll 5. As the roll 5 is rotated, the wheel 123, and therefore the shaft 121, is continuously driven therefrom at a directly proportional speed. Slidably mounted upon the shaft 121 is a clutch member 124, which is operated by means of a pivoted yoke member 125 provided with a handle 126, to engage or desengage a suitably serrated or toothed surface 127 on the sprocket wheel 120. When the yoke 125 is in the position indicated in Fig. 10, the sprocket wheel 123 drives the sprocket wheel 120 through the shaft 121 and the clutch member 124. When the handle 126 is moved to the position indicated in dot-and-dash lines, the member 124 is moved out of engagement with the wheel 127, thus ceasing to drive it. The handle 126 is pivotally connected by means of a rod 128, to a similar handle 129 disposed on the opposite side of the machine and used for a similar purpose, as best shown in Fig. 3.

The sprocket chain 50 is supported at the end opposite the wheel 120 by means of a sprocket wheel 130 mounted upon a supporting block 131, which is slidably mounted upon a rod 132 mounted upon the frame 1, as best shown in Fig. 4. The slidable block 131 is in threaded engagement with a member 133 which is adapted to be rotated by means of a hand crank 134, thus moving the block 131 and sprocket wheel 130 longitudinally of the machine. The purpose of this adjustable mechanism is to permit movement of the wheel 130 so that sprocket chains of various lengths may be employed, for a reason to be hereinafter set forth.

Mounted upon the upright standards 27 and adjacent the roll 24 is a shaft 140 on which are pivotally mounted two levers 141, as best illustrated in Fig. 6. Pivotally mounted on one end of each lever 141 is a marking mechanism member 142 provided with a bluntly pointed transversely extending marking member 143, adapted to engage at intervals, the fabric moving therebeneath. The opposite ends of the levers 141 are connected to a rod 144 connected to the cores of electrical magnets or solenoids 145, mounted on the supporting member 28. The member 142 is adapted to slide substantially vertically against guide members 146, attached to the frame members 27. Two tension springs 147 are connected at one end to the guide member 146, and at the other end to those ends of the levers 141 to which the arms 144 are connected, and serves to retain the member 143 in a normally elevated position out of contact with the fabric moving therebeneath. When the solenoids 145 are energized, they draw the members 144 upwards, thus moving the member 143 downwardly against the action of the spring 147, and causing the marking member 143 to engage the fabric moving therebeneath upon the belt 4 in the direction indicated by the arrow in Fig. 6. The member 143, upon engaging the fabric, moves therewith a short distance until the solenoids 145 are de-energized, thus permitting the spring 147 to raise the member out of contact with the fabric. A leaf spring 148, rigidly mounted upon a transversely extending rod 148ª which pivotally supports the member 142 on the levers 141 permits the member 143 to move with the fabric during the short period of time it is in engagement therewith, and serves to restore the marking member to its normal position when it is raised out of engagement with the moving fabric.

The electrical solenoids 145 are energized by means of a pair of contact members 150 and 151 mounted upon a supporting structure 152 mounted on the frame 1 as best shown in Fig. 11. The members 150 and 151 are disposed one on each side of the sprocket chain 50, but out of engagement therewith. Electrical contact is established therebetween by means of a contact member 153 mounted upon the lug 54 on the chain 50. The member 150 is rigidly mounted upon the supporting member 152 but the member 151 is resiliently mounted therein so as to establish resilient contact with the member 153.

A counting mechanism 160 is mounted upon the supporting member 128, and is provided with an actuating arm 161 in engagement with the marking member 142, which enables the operator to keep a record of the number of bands so made, as the marking mechanism is actuated but once for a single band.

In order to thoroughly understand the operation of my machine, it should be remembered that it is primarily a stitching and marking or measuring device. The two layers of fabric enter the machine in a superimposed relation and in a single long strip. It is necessary that this strip be so acted upon that the point at which it is to be severed to form endless bands of the proper lengths should be clearly marked in an accurate manner, and that those portions of the bands intermediate the ends should be stitched together in intimate relationship. Briefly, the method of utilizing the machine is as follows:

The two layers of fabric enter the machine in a superposed relation and are engaged by rollers which serve to press them into intimate contact with each other over a considerable portion of the length of material to be severed to form an endless band. When a suitable length of material has been measured by the machine, a marking device is actuated to place a transversely extending mark across the entire width of the fabric. When this mark is reached by the rolls which serve to press the layers of material together, they are separated and the fabric moves therebetween without any pressure exerted thereon until sufficient length of material to form the proper splice has passed therebeneath, whereupon the rolls again move into compressing relationship. As the fabric leaves the rolls an operator grasps the upper layer of the material, the cords of which are laid on a bias, and tears it diagonally with the cords until it is severed. He lays the triangularly shaped ends of fabric, which are still attached along one side, back upon the main body portion of the fabric on both sides, thereby revealing a portion of the under layer of sufficient length to form the splice. He then grasps the lower layer of material at the point marked, but at the opposite side of the band from that previously referred to, on account of the fact that in the lower layer the cords are disposed at an angle of 90° with respect to the upper layer, and again tears the fabric diagonally over its entire width. By this method is produced sections of cord tire fabric, the main body portions of which are pressed into intimate contact with each other and the end portions of the separate layers of which are severed diagonally and at an angle to each other in such manner that they may be readily spliced with the opposite end of the same section in order to form an endless band.

Having described the resultant operation of my machine and having described the specific details thereof, its operation is as follows:

As best illustrated in Figures 1 and 2, the two layers of fabric 17 and 18 are unrolled by the operation of the machine from rolls 15a and 16a. These rolls may be replaced when the roll is exhausted and the end of the new roll spliced to the end of the exhausted roll without interrupting the operation of the machine, by reason of the arrangement of the fabric carrying belts 15 and 16. The two strips of fabric 17 and 18, after passing from the belts 15 and 16, respectively, over the rollers 19 and 20, are deposited in superimposed relation upon a main belt 4 as it passes over a relatively large pulley member 5. The two layers of fabric in superimposed relation are moved along with the belt 4 which is power operated by means of a motor 7. As the fabric moves along, it passes over the roller 25, and, assuming that the particular portion of the fabric which constitutes an intermediate section of a portion to be severed, is engaged by the roller 24 to press or stitch the two layers into intimate contact with each other.

As the fabric moves with the belt 4, the sprocket chain 37 passing over the wheel 38 drives the shaft 121. With the lever 126 in its vertical position, the shaft 121, through the clutching members 124 and 127 drives the sprocket wheel 120. The sprocket wheel 120 continuously drives the sprocket chain 50 upon which are mounted the two lugs 53 and 54. As the lug 54 reaches a predetermined point it engages the electrical contact members 150 and 151, thus energizing the electrical solenoids 145, and in the manner previously described, causes the marking member 142 to descend into contact with the fabric moving therebeneath on the belt 4 and to impart thereto a transverse mark extending the width of the fabric. The member 142 moves a very short distance with the fabric and is then raised again to its normal position.

As the fabric continues on its path on the belt 4, it approaches the cooperating rollers 24 and 25 and as the marked portion passes therebeneath, the lug 54 on the sprocket chain 50 engages a pair of cooperating lugs 98 upon the member 97, thus rotating the shaft 93 through an angle of 90°. The movement of the shaft 93 causes a similar rotation of the valve core 89 of the valve 80, thus interconnecting the fluid supply pipe 101 with the pipe 106 through the valves 71 and 72 which are in a position indicated in Fig. 5. The fluid passing through the pipe 106 is carried to cylinders 41 which serve to raise the roller member 24 out of contact with the fabric disposed upon the belt 4. The fabric thereupon moves therebeneath without being pressed into intimate contact until such time as the lug 53 on the chain 50 engages a second pair of lugs 98 upon the members 97 thereby again rotating the shaft 93 and the valve core 89 through an angle of 90°. When the valve core is moved to this position, the fluid connecting pipes 106 are connected to the exhaust pipe 103 by means of the valve core duct 90, thereby permitting the compressing fluid to be exhausted from the cylinders 41 and permitting the spring members 29 to restore the roller 24 to its customary relationship with the roller 25.

It will be apparent that the distance between the lugs 53 and 54 may be varied at will but ordinarily would be of such distance apart that the length of material left unpressed by the rollers 24 would be substantially equal to the longitudinal development of the diagonal splice desired, which in turn is determined by the angle of the cords contained in the fabric. Also, it will be apparent that by adjusting the length of the chain 50, any desired length of endless band for use in building any desired size of tire casing may be provided for.

As has already been described, the marking mechanism 142 and pressing or stitching mechanism 24 are controlled in like manner from either side of the machine. One advantage of this arrangement is that the two chains 50 may be of different lengths, for marking and stitching different lengths of bands, and it may be desired to change from one length of ply to another. When this change is desired the clutch lever 126 is moved to the dot-and-dash position indicated in Fig. 10, thereby disconnecting the sprocket wheel 120 from the shaft 121, but through the connecting member 128, a driving wheel similar to the sprocket wheel 120 is, by a similar arrangement, connected into driving engagement with the shaft 121, thereby driving a chain 50 upon the opposite side of the machine. When it is desired to make this change, the lever 73 is also thrown to the position indicated in dot-and-dash lines in Fig. 4, thereby disconnecting the valve 80 and connecting a similar valve 81 on the opposite side of the machine with the source of fluid supply. When the valve 81 is in operation, a lug 54 thereon operates the solenoids 145 in the manner previously described and lugs 54 and 53 actuate the valve 81 so as to energize the pistons 41 to raise the roll in the manner described in connection with the valve 80.

When one of the chains 50 in the cooperating driving mechanism is in operation, the other one remains idle, thereby enabling an operator to substitute one length chain for another while the machine is being used or to make any other adjustment of the members 53 and 54 on the chain that may be desired.

Although I have illustrated but a single form of my invention and described in detail but a single application thereof, it will be apparent to those skilled in the art that it is not so limited but that various minor modifications and changes may be made therein without departing from the spirit of my invention or from the scope of the appended claims.

What I claim is:

1. A band building machine comprising a traveling endless belt, means for simultaneously feeding a plurality of fabric strips upon the belt and means for marking the strips as they move with the belt.

2. A band building machine comprising a traveling endless belt, means for feeding a plurality of fabric strips upon the belt, and means for automatically marking the strips as they move with the belt.

3. A machine comprising an endless belt, means for automatically marking the strips a plurality of fabric strips upon the belt and means for automatically marking the strips at predetermined intervals.

4. A machine comprising an endless belt, means for driving the belt, means for feeding a plurality of fabric strips upon the belt and mechanism for automatically marking the strips, the mechanism being adjustable to vary the distance between the marks on the strips.

5. A machine comprising an endless belt, means for driving the belt, means for feeding a plurality of fabric strips upon the belt, and mechanism for automatically marking the strips at regular predetermined intervals, said mechanism being adjustable to vary the distance between the marks on the strips.

6. A band building machine comprising a supporting frame provided with an endless belt, means adapted to drive the belt, means for adjusting the belt to travel at various uniform speeds, means for feeding a plurality of fabric strips upon the belt, and mechanism for automatically marking the strips at predetermined intervals.

7. A band building machine comprising a supporting frame provided with a traveling endless belt, means for driving the belt, means for feeding a plurality of rubberized fabric strips upon the belt, means carried by the supporting frame for stitching the strips together, and means for marking the strips at predetermined intervals.

8. A band building machine comprising a supporting frame provided with an endless belt, means for driving the belt, means for feeding a plurality of rubberized fabric strips upon the belt, means carried by the frame for stitching the strips together, means adapted to temporarily relieve the stitching means from contact with the strips at predetermined regular intervals in the travel of the belt.

9. A band building machine comprising a supporting frame provided with an endless conveyor belt driven from a source of power, means for feeding a plurality of rubberized fabric strips upon the belt in superimposed relationship, means carried by the frame for stitching the strips together, and a marker automatically controlled to engage the strips at equal predetermined intervals.

10. A band building machine comprising a supporting frame provided with an endless conveyor belt driven from a source of power, means for feeding a plurality of rubberized fabric strips upon the belt, roller mechanism carried by the frame and adapted to stitch the strips together, and means for moving the roller mechanism out of contact with the strips at regular intervals in the travel of the belt.

11. A band building machine comprising a supporting frame provided with an endless belt driven from a source of power, means for feeding a plurality of rubberized fabric strips upon the belt, a roller mechanism carried by the frame and adapted to stitch the strips together, and means automatically operated for relieving the roller mechanism from contact with the strips at regular intervals in the travel of the belt.

12. A band building machine comprising a supporting frame provided with an endless conveyor belt driven from a source of power, means for feeding a plurality of rubberized fabric strips upon the belt, a roller mechanism carried by the frame and adapted to stitch the strips together, means for relieving the roller mechanism from contact with the strips at equal predetermined intervals, and a marker disposed adjacent the roller mechanism and adapted to engage the strips at predetermined equal intervals.

13. A band building machine comprising a supporting frame provided with an endless conveyor belt driven from a source of power, means for feeding a plurality of fabric strips upon the belt, a roller mechanism carried by the frame for stitching the strips together, means for automatically disengaging the roller mechanism momentarily from contact with the strips at equal predetermined intervals, and a marker disposed adjacent the roller mechanism and adapted to automatically engage the strips at predetermined equal intervals, the engagement of the marker with the strips occurring during the time when the roller mechanism is disengaged from the strips.

14. A band building machine comprising a frame provided with an endless belt, means for driving the belt, means for simultaneously feeding a plurality of fabric strips upon the belt, a mechanism mounted upon the frame and arranged transversely with respect to the direction of travel of the belt, and means associated with said mechanism for stitching together and marking the fabric strips as they pass with the endless belt adjacent the support.

15. A band building machine comprising a frame provided with an endless belt, means for driving the belt, means for feeding a plurality of fabric strips upon the belt, a supporting member mounted upon the frame and arranged transversely with respect to the direction of travel of the belt, and means associated with the supporting member and automatically operated for stitching together and marking the strips at predetermined intervals as they pass with the endless belt adjacent the support.

16. A band building machine comprising a frame provided with a traveling endless belt, means for driving the belt, means for feeding a plurality of fabric strips upon the belt, a stitching roll operating against the strips and geared to rotate at the same peripheral speed as the belt, and means including a fluid actuated mechanism for momentarily raising the roll at predetermined intervals in the travel of the belt.

17. A band building machine comprising a frame provided with an endless belt, means for driving the belt, means for feeding a plurality of fabric strips upon the belt, a stitching roll adapted to engage the strips and geared to rotate at the same peripheral speed as the belt, and an idler roll in cooperative relationship with the stitching roll, the belt carrying the strips being yieldably pressed between the rolls.

18. A band building machine comprising an endless belt, means for driving the belt, means for simultaneously feeding a plurality of fabric strips upon the belt, and electrically operated means for marking the strips as they move with the belt.

19. A band building machine comprising an endless belt, means for driving the belt, means for simultaneously feeding a plurality of fabric strips upon the belt, a stitching roll adapted to operate against the strips and geared to rotate at the same peripheral speed as the belt, and springs adapted for holding the roll in resilient contact with the strips.

20. A band building machine comprising a frame provided with an endless belt driven from a source of power, means for feeding a plurality of fabric strips upon the belt, a transversely arranged supporting member mounted on the frame, marking means mounted upon the support adapted to engage the strips, and mechanism mounted upon the frame adjacent the support for operating the marking means.

21. A band building machine comprising a frame provided with an endless belt adapted to be driven from a source of power, means for feeding a plurality of fabric strips upon the belt, a transversely arranged supporting member mounted on the frame, marking means mounted upon the support and adapted to engage the strips, and mechanism including sprocket chain gearing mounted upon the frame for automatically controlling the operation of the marking means.

22. A band building machine comprising a frame provided with an endless belt adapted to be driven from a source of power, means for feeding a plurality of fabric strips upon the belt, a mangle roll supported transversely of the frame upon a vertically slidable bearing member, a cylinder communicating with a source of fluid under pressure and provided with a piston connected to the slidable bearing member, and mechanism mounted upon the frame for automatically controlling the supply of fluid admitted to the cylinder to raise the mangle roll, the controlling mechanism being actuated at equal intervals in the travel of the belt.

23. A machine comprising a frame provided with an endless belt adapted to be driven from a source of power, means for feeding a plurality of fabric strips upon the belt, a mangle roll supported transversely of the frame upon vertically movable bearing members disposed adjacent its ends, a cylinder provided with a piston and communicating with a supply of fluid under pressure, the piston being attached to one of the movable bearings, and mechanism mounted upon the frame including a sprocket chain gearing mechanism adapted to automatically control the supply of fluid admitted to the cylinder to raise the mangle roll.

24. A band building machine comprising a frame provided with an endless belt adapted to be driven from a source of power, means for feeding a plurality of fabric strips from the belt, a mangle roll supported transversely of the frame upon vertically movable bearing members disposed adjacent its ends, a cylinder arranged on each side of the frame provided with a piston and communicating with a supply of fluid under pressure, each piston being attached to one of the movable bearing members, and mechanism mounted upon each side of said frame including a sprocket chain gearing mechanism for automatically controlling the supply of fluid and operatively connected to each cylinder to raise the mangle roll momentarily at equal intervals in the travel of the belt.

25. A band building machine comprising a frame provided with an endless belt driven from a source of power, means for feeding a plurality of fabric strips upon the belt, a mangle roll supported transversely of the frame upon vertically movable bearing members disposed adjacent its ends, a cylinder disposed on each side of the frame provided with a piston and communicating with a supply of fluid under pressure, each piston being attached to one of the sliding bearing members, and mechanism mounted upon each side of the frame including a sprocket chain gearing mechanism adapted to automatically control the supply of fluid admitted to said cylinder to raise the mangle roll momentarily at equal intervals in the travel of the belt, the mechanism on one side of the frame adapted to be idle while the mechanism on the other side of the frame is in operation.

26. A band building machine comprising a frame provided with an endless belt driven from a source of power, means for feeding a plurality of fabric strips upon the belt, a mangle roll supported transversely of the frame upon vertically movable bearing members disposed adjacent its ends, a cylinder arranged on each side of the frame provided with a piston and communicating with a source of fluid under pressure, each piston being attached to one of the movable bearing members, mechanism mounted on each side of the frame including sprocket chain gearing mechanism driven by the said source of power for controlling the supply of fluid admitted to the cylinder to automatically raise the mangle roll momentarily at equal intervals in the travel of the belt, and a clutch mechanism associated with the sprocket chain gearing mechanism for disconnecting one gearing mechanism from operative communication with the source of power and connecting the other gearing mechanism operatively with the source of power.

27. A band building machine comprising a frame provided with a power driven endless belt adapted to convey fabric strips, stitching means mounted on the frame transversely of the belt, a cylinder having a piston associated with said stitching means, gearing mechanism adapted to be driven by the same source of power that drives the belt and adapted to carry an endless chain disposed adjacent the side of the frame, a pipe provided with valve mechanism disposed adjacent said chain and accommodating the flow of fluid under pressure and being in communication with said cylinder, and lugs on the chain engaging the valve mechanism at predetermined intervals to successively open and close the valve.

28. A band building machine comprising a frame provided with a power driven endless belt adapted to convey fabric strips thereon, a member mounted transversely of the frame, a marking means mounted on the member, a stitching roll, a cylinder associated with said stitching roll, a gearing mechanism driven in synchronism with the belt including an endless chain disposed at the side of the frame, a pipe adapted to convey fluid under pressure and provided with a regulating valve mechanism disposed adjacent said chain and operatively connected to the cylinder associated with the stitching roll, an electrical circuit provided with a switch disposed adjacent said chain and adapted to actuate the marking means, and lugs mounted on the chain adapted to engage the said valve and switch for successively raising the roll, operating the marking means, and releasing the roll from raised position at predetermined intervals in the travel of the belt.

29. A band building machine comprising a frame provided with a power driven endless belt adapted to convey fabric strips, marking means mounted on the frame transversely of the belt, gearing mechanisms driven by the same source of power that drives the belt and adapted to carry endless chains disposed adjacent the sides of the frame, an electrical circuit provided with switches adapted to activate the marking means and disposed adjacent the chains, and a lug on each of said chains adapted to close the cooperating switch at predetermined intervals to operate the marking means against the fabric strips.

30. A band building machine comprising a mechanism driven from a source of power, a continuous movable member adapted to convey fabric strips along one portion thereof, means for stitching and marking the fabric strips at predetermined intervals, two sets of control mechanisms governing the operation of said means, one set being idle while the other is in operation, and clutch mechanism adapted to throw one set into operative connection and in the same movement throw the other set out of operative connection.

31. A band building machine comprising a frame carrying an endless belt driven from a source of power, stitching means and marking means mounted adjacent the belt and adapted to engage fabric strips fed upon the belt, two sets of sprocket chain gearing mechanisms arranged on opposite sides of the frame for controlling the stitching and marking means, and a clutch mechanism adapted to throw one set out of operation and the other set into operation with the same mechanical movement.

32. A band building machine comprising a frame provided with a power driven endless belt adapted to convey fabric strips, a stitching roll and marking means mounted on said frame, a cylinder associated with said stitching roll to move the same, mechanism driven from the same source of power that drives the belt including an endless chain disposed adjacent the side of the frame, a pipe conveying fluid under pressure provided with a valve mechanism disposed adjacent the chain, the pipe being connected to the cylinder associated with the stitching roll, an electric circuit provided with a switch disposed adjacent the chain and adapted to actuate the marking means, lugs on the chain operating the valve and switch for successively operating the marker raising the roll and releasing the roll from raised position at predetermined intervals in the travel of the belt, and adjustable means associated with the chain whereby various lengths of chains may be used.

33. A band building machine comprising a frame provided with a power driven endless belt adapted to convey fabric strips, a stitching roll and a marking means mounted on the frame, a cylinder associated with the roll to raise the same, a gearing mechanism driven in synchronism with the belt including an endless chain interconnecting spaced sprocket wheels disposed at the side of the frame, a pipe conveying fluid under pressure and provided with a valve mechanism disposed adjacent the chain and operatively connected to the cylinder associated with the stitching roll, an electrical circuit provided with a switching mechanism disposed adjacent the chain and adapted to actuate the marking means, lugs mounted on the chain operating said valve and switch for successively operating the marker raising the roll and releasing the roll from a raised position at predetermined intervals in the travel of the belt, a bearing member slidably mounted on the frame and adapted to rotatably support one of the sprocket wheels, and means for adjusting the position of the bearing member whereby various lengths of chains may be used.

34. A band building machine comprising a frame provided with a power driven endless belt adapted to convey fabric strips, a stitching roll and a marking means mounted on the frame, fluid operated cylinders associated with the roll to move the same, a gearing mechanism driven at a speed directly proportional to that of the belt including endless sprocket chains disposed at opposite sides of the frame, a pipe conveying fluid under pressure and provided with controlling valve mechanisms disposed at opposite sides of the frame adjacent the chains and connected to the cylinders, an electrical circuit provided with a switching mechanism disposed adjacent each of the chains and adapted to control the actuation of the marking means, lugs on the chains adapted to operate the valves and switches for successively operating the marking means raising the roll and releasing the roll from raised position at predetermined intervals in the travel of the belt, and a clutch mechanism extending across the frame and connected to both sets of gearing mechanism and adapted to simultaneously release one gearing mechanism from operative connection as the other is brought into operative engagement.

35. A band building machine comprising a frame provided with a power driven endless belt adapted to convey fabric strips, a member mounted transversely of the frame, a marking means mounted on the member, a stitching roll mounted on the frame, two fluid operated cylinders associated with the roll, gearing mechanisms driven at a speed directly proportional to that of the belt including an endless sprocket chain disposed at each side of the frame, a pipe conveying fluid under pressure provided with a controlling valve mechanism disposed on each side of the frame adjacent the chain, the fluid pipe being operatively connected to the cylinders to actuate the stitching roll, an electric circuit provided with a switch disposed adjacent each of the chains and adapted to actuate the marking means, lugs on the chain adapted to operate the valves and switches for successively operating the marking means raising the roll and releasing the roll from raised position at predetermined intervals in the travel of the belt, the gearing mechanism on one side of the frame being adapted to be operated while the mechanism on the other side of the frame is idle, and valve means for directing the flow of the fluid under pressure to either side of the frame.

36. A band building machine comprising a frame provided with an endless belt adapted to be driven at a uniform speed from a source of power, means for feeding a plurality of fabric strips upon the belt, stitching and marking means mounted adjacent the belt and adapted to engage the strips, gearing on the frame including a sprocket chain adapted to automatically operate the stitching and marking means, the sprocket chain being driven by the source of power at a speed directly proportional to that of the endless belt.

37. A band building machine comprising a frame provided with an endless belt adapted to be driven at a uniform speed from a source of power, means for feeding a plurality of fabric strips upon the belt, a mangle roll mounted upon the frame for stitching the strips together, a gearing mechanism mounted on the frame including a sprocket chain operatively associated with the roll for temporarily releasing it from engagement with the strips at regular intervals, the belt chain and roll being driven at a speed directly proportional to that of the belt by means of operative connections with the source of power.

In witness whereof, I have hereunto signed my name.

ELOV F. MAAS.